(12) United States Patent
Inoue et al.

(10) Patent No.: US 6,328,604 B1
(45) Date of Patent: Dec. 11, 2001

(54) CONNECTION STRUCTURE FOR BATTERY UNIT

(75) Inventors: Hiroshi Inoue; Shinji Hamada, both of Toyohashi; Noriyuki Fujioka, Kosai, all of (JP)

(73) Assignees: Matsushita Electric Industrial Co., Ltd., Osaka; Toyota Jidosha Kabushiki Kaisha, Aichi, both of (JP)

( * ) Notice: Subject to any disclaimer, the term of this patent is extended or adjusted under 35 U.S.C. 154(b) by 0 days.

(21) Appl. No.: 09/664,318

(22) Filed: Sep. 18, 2000

(30) Foreign Application Priority Data

Sep. 21, 1999 (JP) .................................. 11-267027

(51) Int. Cl.⁷ .................................. H01R 33/00
(52) U.S. Cl. .................... 439/627; 439/521; 439/522
(58) Field of Search .................. 439/627, 519, 439/521, 522

(56) References Cited

U.S. PATENT DOCUMENTS

| 3,712,645 | * | 1/1973 | Herter | 285/95 |
| 5,725,396 | | 3/1998 | Stocchiero | 439/627 |

FOREIGN PATENT DOCUMENTS

| 0825658 | 2/1998 | (EP) . |
| 10-64507 | 3/1998 | (JP) . |
| 90/05999 | 5/1990 | (WO) . |

OTHER PUBLICATIONS

1 English Language Abstract of JP 10–64507.

* cited by examiner

*Primary Examiner*—Paula Bradley
*Assistant Examiner*—Ann McCamey
(74) *Attorney, Agent, or Firm*—Greenblum & Bernstein, P.L.C.

(57) ABSTRACT

Connection structure of a battery unit for connecting respective terminals of a plurality of cells that are encased in cell cases, wherein positive and negative terminals of the cells respectively extend through the cell cases. The connecting structure includes coupling plates screwed on the respective terminals of the plurality of cells for electrically connecting the terminals of opposite polarity with each other. Covering members are provided which are made from an elastic material for covering the periphery of the terminals and coupling plates in such a manner that they are sealed with respect to the exterior of the battery unit. The covering members include tubular sections which are pressed against surfaces of the cell cases about the periphery of the terminals utilizing the coupling plates. Annular clamping sections which are formed on an inner circumference of the tubular sections. The annular clamping sections are clamped between the coupling plates and fixing washers for fixing the terminals.

20 Claims, 5 Drawing Sheets

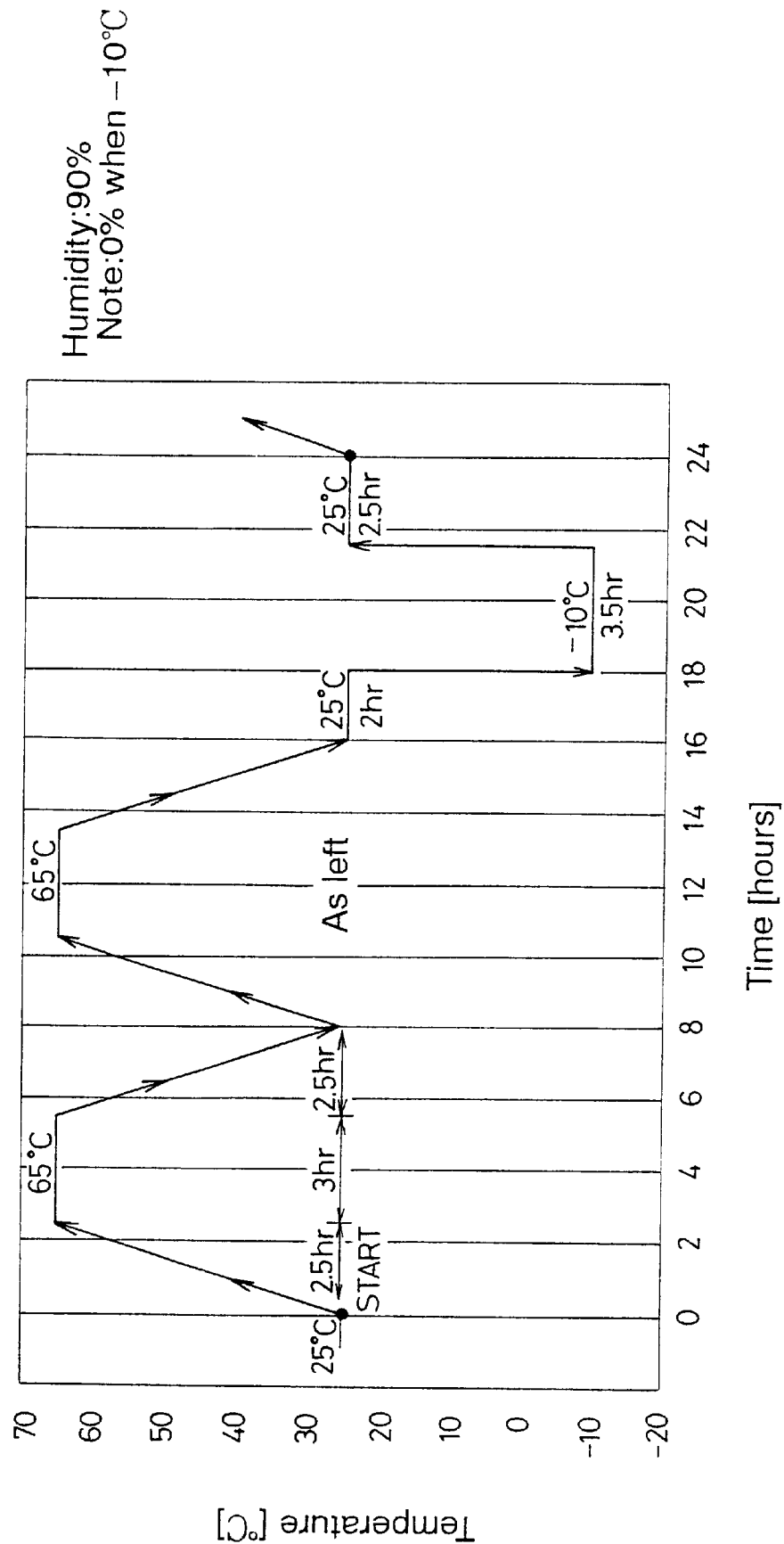

CONNECTION STRUCTURE FOR BATTERY UNIT

BACKGROUND OF THE INVENTION

1. Field of the Invention

The present invention relates to a connection structure for a battery unit for providing connections between terminals of a plurality of cells.

2. Description of Related Art

In order to improve long-term durability of a battery unit wherein a plurality of cells are connected, it is essential both to improve the characteristics of the elements for electromotive force in the cells and to improve the durability of the connecting sections providing electrical connections between the cells. Specifically, any deterioration due to corrosion of the connecting sections which come into contact with external air will lead to increased electrical resistance, and hence this becomes a major cause of decline in the output characteristics of a battery unit. Therefore, in the prior art, connection structures for preventing corrosion of the connecting sections by sealing them from the external air have been proposed, as disclosed in Japanese Patent Laid-open No.(Hei)10-64507, for example.

Below, a connection structure for a battery according to the prior art is described with reference to FIG. 6–FIG. 8. As shown in FIG. 6, a cell 1 is constituted by elements for electromotive force 3, wherein positive electrode plates and negative electrode plates are layered together, separators being interposed therebetween, which are accommodated and sealed inside a battery case 2 of rectangular cross-section made from synthetic resin, together with an electrolyte. Terminals 5, 6 for the positive electrode and negative electrode are provided respectively projecting from either end portion of the upper face 4 of the battery case 2, these being connected respectively to the positive electrode plates and negative electrode plates via lead plates 7. The terminals 5, 6 penetrate into the interior of the battery case 2 by means of terminal holes formed in the upper face 4 of the battery case 2, and they are fastened by means of fixing washers 8 in a state where a seal is provided between same and the upper face 4 of the battery case 2. Numeral 9 denotes a safety vent for discharging gas in cases where the pressure inside the cell increases abnormally.

As illustrated in FIG. 7, a battery unit 10 is constituted by arranging cells 1 of the aforementioned construction in a parallel configuration, in such a manner that the positive electrode terminals 5 and negative electrode terminals 6 thereof are situated adjacently to each other in an alternating fashion, these adjacent positive electrode terminals 5 and negative electrode terminals 6 being connected by means of connecting members 11.

As shown in FIG. 8, the connecting members 11 are each constituted by a coupling plate 12 made from copper plate for connecting the terminals 5, 6 together, and a cover member 13 made from chloroprene rubber for covering the periphery of the terminals 5, 6 and the coupling plate 12 in such a manner that they are sealed from the external atmosphere.

The coupling plates 12 are respectively made from an oval-shaped plate having connecting holes 12a through which screw shaft portions of the terminals 5, 6 are passed, which is positioned on top of step sections in the base portions of the terminals 5, 6 and fastened by means of nuts 14 screwing onto the screw shaft portions of the terminals 5, 6.

Each cover member 13 comprises tubular sections 15 respectively surrounding the periphery of a terminal 5, 6 and a nut 14, and a coupling section 16 for coupling the tubular sections 15, a coupling plate 12 being embedded integrally inside the cover member 13. Naturally, the coupling plate 12 is exposed inside the tubular sections 15. When coupling plates 12 are fastened tightly onto the terminals 5, 6, the lower end portions of the tubular sections 15 exert pressure on the upper face 4 of the battery case, about the periphery of the terminals 5, 6 via the coupling plate 12. The upper opening portions of the tubular sections 15 are sealed openably by way of lid members 17, in such a manner that they can be closed tightly after the nuts 14 have been fastened.

However, in the connection structure for a battery described above, an external seal is formed by means of the lower ends of the tubular sections 15 pressing against the coupling plates 12, thereby exerting pressure on the upper face 4 of the battery case. Consequently, whilst it is possible to prevent corrosion of the terminals 5, 6 and coupling plates 12 through exposure to the external atmosphere, the tubular sections 15 are liable to deform in an outward radial direction, due to the aforementioned pressure. As a result of this deformation, the seal between the tubular section 15 and the upper face 4 of the battery case becomes insufficient, and consequently, in an operating environment where the battery is exposed to severe variations in temperature conditions, electrolyte seeping between the base portions of the terminals 5, 6 and the fixing washers 8, and between the fixing washers 8 and the upper face 4 of the battery case, as indicated by the arrows in FIG. 8, will flow out at any points where the seal between the lower ends of the tubular sections 15 and the upper face 4 of the battery case is incomplete.

SUMMARY OF THE INVENTION

The present invention was devised with the foregoing in view, an object thereof being to provide a connection structure for a battery unit whereby escape of seeping electrolyte can be prevented in a reliable manner.

The connection structure for a battery according to the present invention, wherein respective terminals of a plurality of cells are mutually connected by way of coupling plates, comprises covering members made from an elastic material covering the periphery of the terminals and coupling plates in such a manner that they are sealed with respect to the exterior of the battery. The covering members comprise tubular sections which are pressed against the battery case surfaces about the periphery of the terminals by way of the coupling plates, when the coupling plates are affixed tightly to the terminals, and ring-shaped clamping sections which are clamped between the coupling plates and fixing washers surrounding the base portions of the terminals are provided on the inner circumference of the tubular sections. Any displacement or deformation of the tubular sections is restricted by way of the clamping sections being clamped between the coupling plates and the fixing washers, and hence the tubular sections are pressed against the upper faces of the battery cases in a stable fashion, thereby ensuring good sealing properties and making it possible to prevent escape of seeping electrolyte in a reliable manner.

Moreover, if a sealing projection having a semicircular or pointed cross-section is provided on the end portion of each tubular section confronting the battery case surface, then the sealing projections will display a reliable sealing function and ensure good sealing performance.

Furthermore, if dual-type inner and outer sealing projections are provided extending respectively on the inner circumference side and outer circumference side of the end portion of each tubular section confronting the battery case surface, then good sealing properties can be obtained with respect to infiltration from outside the battery and escape of electrolyte from inside the battery.

Moreover, if the sealing projections are provided in a circular fashion about the inner circumference of each tubular section, cutaway sections for avoiding interference with members disposed in the side regions of the terminals being formed in side faces of the tubular sections, and these cutaway sections being formed within a range whereby the sealing projections are able to maintain a uniform cross-section throughout the circumference thereof, then interference with peripheral members can be avoided by way of the cutaway sections, whilst ensuring good sealing properties by way of the circular sealing projections having a uniform cross-section.

Furthermore, by adopting the use of silicone rubber producing little permanent distortion on compression for the cover members, distortion of the cover members can be suppressed, and sealing properties can be ensured in a stable manner over a long period of time. Specifically, by using silicone rubber of Shore hardness Hs 65 or above, good sealing properties can be obtained. For example, in the case of chloroprene rubber having a Shore hardness of about Hs 50, a pressing force of 7 kgf can be applied, whereas in the case of silicone rubber having a Shore hardness of Hs 70, a high pressing force of 10–15 kgf can be applied.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 5 is a graph illustrating leakage test conditions;

DESCRIPTION OF THE PREFERRED EMBODIMENTS

Figure 6:
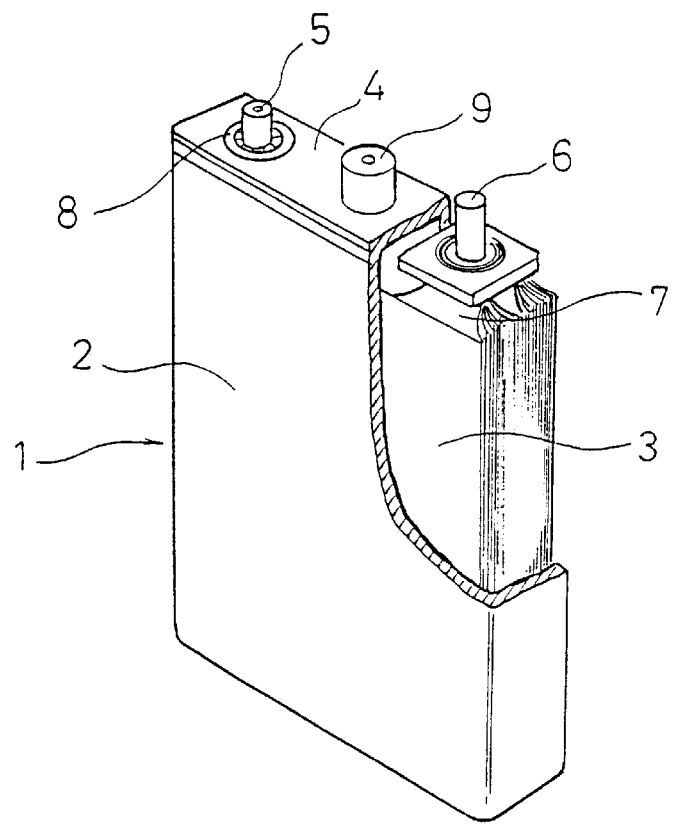
FIG. 6 is a partially cutaway oblique view showing an example of the construction of a cell.
Figure 7:
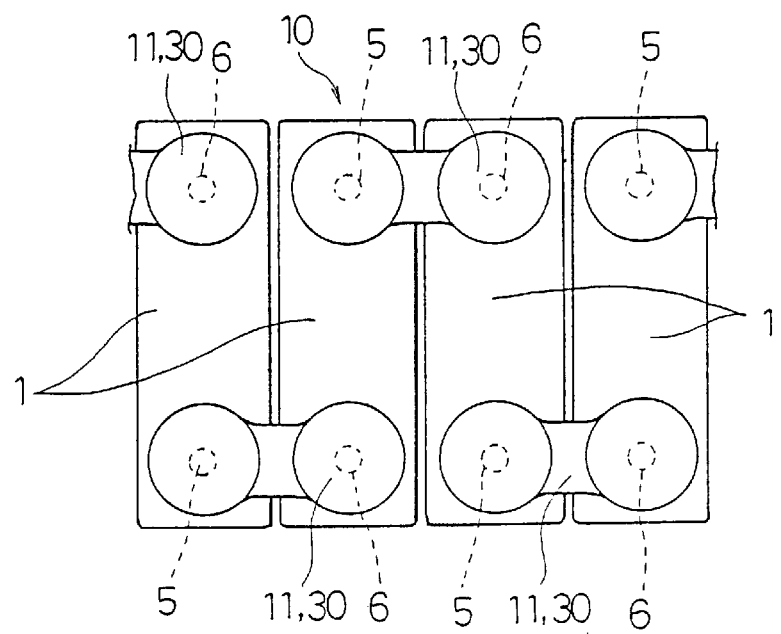
FIG. 7 is a plan view of a battery unit wherein cells are connected.
Figure 8:
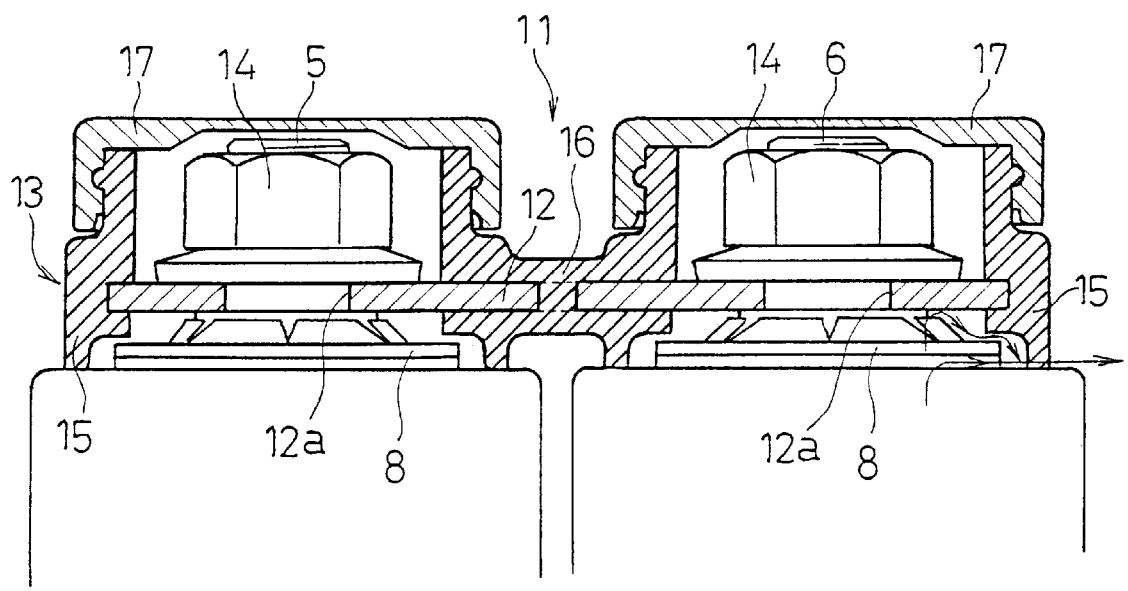
FIG. 8 is a vertical sectional view of a connection structure for a battery according to the prior art.

Below, one embodiment of the connection structure for a battery unit according to the present invention is described with reference to FIG. 1–FIG. 5. The construction of the cells 1 and battery unit 10 are similar to the prior art example described previously with reference to FIG. 6 and FIG. 7, and hence the foregoing description is cited here. Furthermore, in the following description, similar reference numerals are used for structural elements which are the same as those in prior art example.

Figure 1:
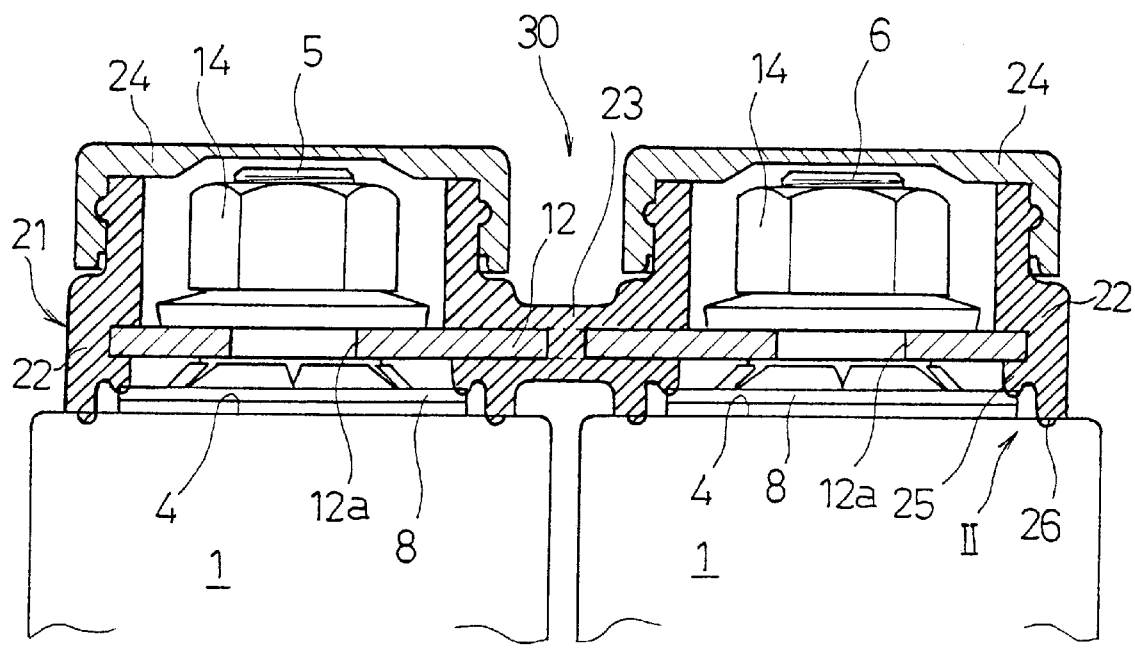
FIG. 1 is a vertical sectional view of a connection structure for a battery unit according to one embodiment of the present invention.

As illustrated in FIG. 1, the connecting member 30 according to the present embodiment comprises a coupling plate 12 made from copper plate for connecting terminals 5, 6, and a cover member 21 for covering the periphery of the terminals 5, 6 and coupling plate 12 in such a manner that the elements are sealed from the external air.

The coupling plate 12 is made from an oval-shaped plate comprising connecting holes 12a through which the screw shaft portions of terminals 5, 6 can pass, and it is positioned on top of step sections in the base portions of the terminals 5, 6 and affixed tightly by way of nuts 14 which screw onto the screw shaft portions of the terminals 5, 6.

The cover member 21 is made from silicone rubber having Shore hardness of Hs 65 or above, and preferably, approximately 70. Incidentally, the cover member 13 in the prior art example was made from chloroprene rubber having a Shore hardness of approximately Hs 50–55. The permanent distortion under compression of the silicone rubber used in the present embodiment (test conditions: 100° C., 25% deformation, 70 hours) is approximately 8%, which is markedly smaller than the figure of 40% permanent distortion under compression obtained for the chloroprene rubber used in the prior art.

Each cover member 21 comprises tubular sections 22 respectively surrounding the vicinity of a terminal 5, 6 and a nut 14, and a coupling section 23 for coupling the tubular sections 22, a coupling plate 12 being embedded integrally inside the cover member 21. Naturally, the coupling plate 12 is exposed inside the tubular sections 22. When coupling plates 12 are fastened tightly onto the terminals 5, 6, the lower end portions of the tubular sections 22 exert pressure on the upper face 4 of the battery case, about the periphery of the terminals 5, 6 via the coupling plate 12. The upper opening portions of the tubular sections 22 are sealed openably by way of lid members 24, in such a manner that they can be closed tightly after the nuts 14 have been fastened.

Figure 2:
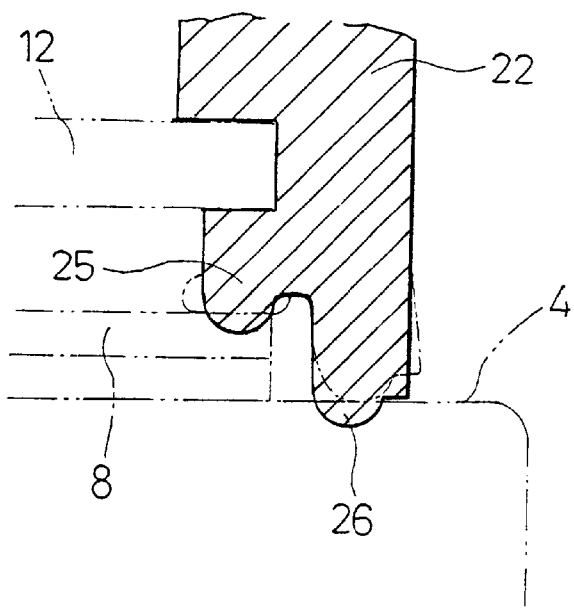
FIG. 2 is an enlarged detailed view of section II in FIG. 1.
Figure 3:
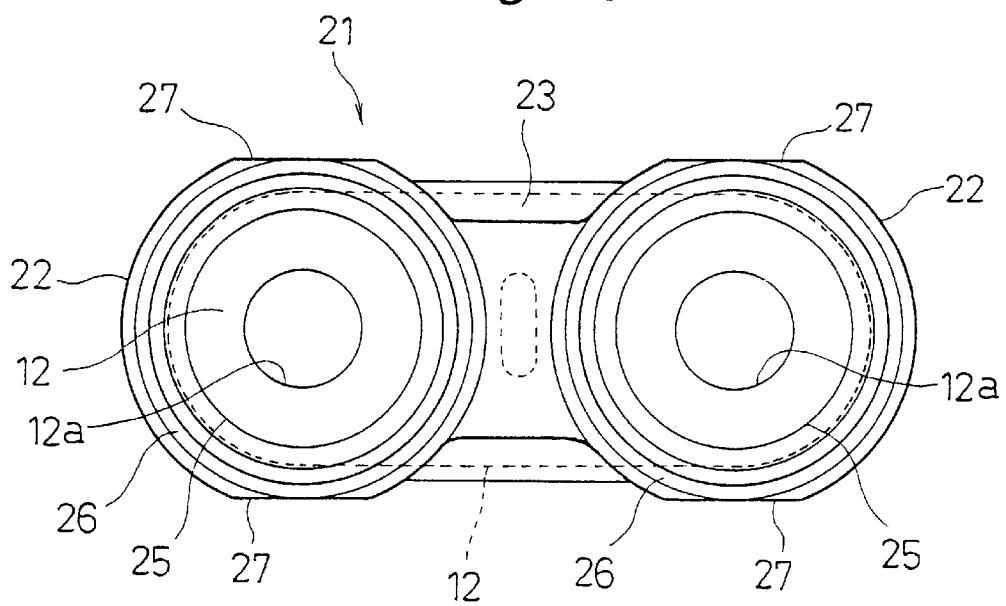
FIG. 3 is a view of the lower face of a connecting member according to the aforementioned embodiment.

As shown in FIG. 2, in the cover member 21, a ring-shaped clamping section 25 which is clamped between a coupling plate 12 and a fixing washer 8 of a terminal 5, 6, is provided on the inner circumference of each tubular section 22. Moreover, a sealing projection 26 having a semicircular or pointed cross-section, is provided in the end portion of the tubular section 22 where it confronts the upper face 4 of the battery case. The sealing projection 26 is provided in a circular fashion about an inner circumference of the tubular section 22, as shown in FIG. 3, and furthermore, cutaway sections 27 are formed on the side faces of the tubular section 22 in order to prevent interference with members (not illustrated) provided in the peripheral regions of the terminals 5, 6.

According to the construction described above, displacement and deformation of the tubular sections 22 is restricted by way of the clamping sections 25 being held between the coupling plates 12 and fixing washers 8, and hence the tubular sections 22 are pressed against the upper face 4 of the battery case in a stable fashion. Moreover, since sealing projections 26 having a semicircular or pointed cross-section are provided on the end portions of the tubular sections 22 confronting the upper face 4 of the battery case, and since these sealing projections 26 are provided in a circular fashion about the inner circumference of the tubular sections 22, maintaining a uniform cross-section throughout the circumference thereof, even in cases where cutaway sections 27 are formed in the side faces of the tubular sections 22, then good sealing properties are ensured in the sealing projections 26, and escape of seeping electrolyte can be prevented in a reliable manner. Moreover, a merit is also obtained in that any escape of seeping electrolyte passing over the fixing washers 8 is prevented by way of the clamping sections 25 pressing against the fixing washers 8.

Furthermore, since cutaway sections 27 are formed in side faces of the tubular sections 22, as described above, it is possible to prevent interference with other members located on the upper face 4 of the battery case of each cell 1, in the vicinity of the terminals 5, 6.

Moreover, since the cover members 21 are made from silicone rubber, which, having a Shore hardness of Hs 65 or above, produces little permanent distortion on compression and enables good sealing characteristics to be obtained by way of a high pressing force of approximately 10–15 kgf being exerted on the respective tubular sections 22 when the coupling plates 12 are tightly fastened, it is possible to reduce distortion of the tubular members 22 and sealing projections 26, and hence good sealing properties can be ensured in a stable manner over a long period of time.

Leakage tests were conducted for a battery unit 10 using connecting members 30 according to the present embodiment described above and a battery unit 10 using connecting members 11 according to the prior art. The leakage tests were conducted according to MIL specifications. Specifically, the battery units were subjected to a repeated 24-hour temperature change cycle, whereby they were heated from 25° C. to 65° C. and held at that temperature for 3 hours, whereupon they were returned to 25° C., heated again to 65° C., held at that temperature for 3 hours, returned to 25° C., then cooled to −10° C., held at that temperature for 3.5 hours, and then returned to 25° C., as illustrated in FIG. 5. The humidity conditions were 90% (0% during the period at −10° C.).

Under these severe test conditions, in the battery unit fitted with prior art connecting members, evidence of electrolyte reaction was detected on the outer side faces of the seal sections on the fifth day of testing, whereas in the battery unit fitted with connecting members according to the present embodiment, evidence of electrolyte reaction was detected on the outer side faces of the seal sections on the sixtieth day of testing. In this way, it was demonstrated that by using the connecting members according to the present embodiment, the efficacy of preventing escape of electrolyte from the inside of a battery is dramatically improved.

Figure 4A:
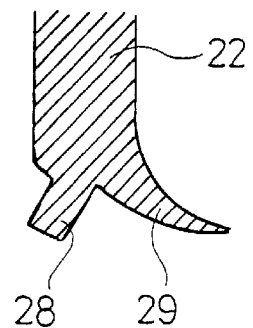
FIG. 4A and FIG. 4B are sectional views of an example of deformation of a sealing section according to the aforementioned embodiment.
Figure 4B:
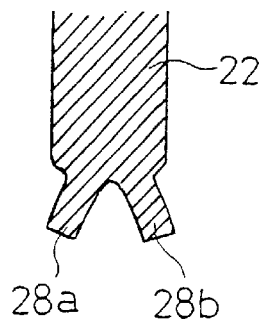

The foregoing description of an embodiment related to an example where a single sealing projection 26 having a semicircular cross-section is provided on the lower end of each tubular section 22, but as shown in FIG. 4A, it is also possible to provide dual-type inner and outer sealing projections 28, 29, extending from the inner circumference side and the outer circumference side of the end portion of each tubular section 22 confronting the upper face 4 of the battery case. The inner-side sealing projection 28 extends with an approximately uniform cross-section, in such a manner that it receives a strong pressing force, whilst the outer-side sealing projection extends in the shape of a tongue having a pointed cross-section. Furthermore, it is also possible to provide sealing projections 28a, 28b extending with an approximately uniform cross-section on both the inner and outer sides, as illustrated in FIG. 4B.

By providing dual sealing projections 28, 29 or 28a, 28b in this way, it is possible to obtain even better sealing properties with respect to both infiltration from outside the battery and escape of electrolyte from inside the battery.

As the foregoing description reveals, according to the connection structure for a battery according to the present invention, since ring-shaped clamping sections, which are clamped between coupling plates and fixing washers surrounding the base sections of terminals, are provided on the inner circumference of tubular sections of cover members which are pressed against the upper face of a battery case about the periphery of terminals by way of coupling plates when the coupling plates are affixed tightly onto the terminals, it is possible to restrict displacement and deformation of the tubular section by way of the clamping sections being held between the coupling plates and the fixing washers, and hence the tubular sections are pressed against the upper face of the battery case in a stable fashion, thereby ensuring good sealing properties and making it possible to prevent escape of seeping electrolyte in a reliable manner.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A connection structure of a battery unit for connecting respective terminals of a plurality of cells that are encased in cell cases, wherein positive and negative terminals of the cells respectively extend through the cell cases, comprising:
   coupling plates screwed on the respective terminals of the plurality of cells for electrically connecting the terminals of opposite polarity with each other;
   covering members made from an elastic material for covering the periphery of the terminals and coupling plates in such a manner that they are sealed with respect to the exterior of the battery unit; wherein the covering members comprise
   tubular sections which are pressed against surfaces of the cell cases about the periphery of the terminals utilizing the coupling plates, and
   annular clamping sections which are formed on an inner circumference of the tubular sections,
   wherein the annular clamping sections are arranged to be clamped between the coupling plates and fixing washers for fixing the terminals.

2. The connection structure for a battery unit according to claim 1, wherein the covering members are made from silicone rubber having a Shore hardness of Hs 65 or above.

3. The connection structure for a battery unit according to claim 1, wherein a sealing projection having a semicircular or pointed cross-section is provided on the end portion of each tubular section confronting the cell case surface.

4. The connection structure for a battery unit according to claim 3, wherein the sealing projections are provided in a circular fashion about the inner circumference of each tubular section, such as to have a uniform cross-section throughout the circumference thereof, and cutaway sections for avoiding interference with members disposed in the peripheral regions of the terminals are formed in side faces of the tubular sections.

5. The connection structure for a battery unit according to claim 1, wherein a pair of inner and outer sealing projections are provided extending respectively on the inner circumference side and outer circumference side of the end portion of each tubular section confronting the cell case surface.

6. The connection structure for a battery unit according to claim 5, wherein the sealing projections are provided in a circular fashion about the inner circumference of each tubular section, such as to have a uniform cross-section throughout the circumference thereof, and cutaway sections for avoiding interference with members disposed in the peripheral regions of the terminals are formed in side faces of the tubular sections.

7. A connection structure for a battery unit having at least two cells wherein each of the at least two cells includes terminals, each terminal having at least one clamping washer, the connecting structure comprising:

at least one coupling plate arranged to connect a terminal of one cell to a terminal of another cell;

at least one covering member comprising two tubular sections, each tubular section being arranged to cover a terminal;

each tubular section comprising an inner section and an outer section;

each outer section being arranged to surround a terminal and to pressed against a cell surface so as to create an outer seal with the cell surface;

each inner section being adapted to be clamped between the at least one clamping washer and the at least one coupling plate so as to create an inner seal with the at least one clamping washer;

the connecting structure further comprising at least one of:

a lid for covering each tubular section in order to allow access to the terminal when each lid is opened or removed;

a projection arranged on the inner section which is deformed when the inner section is clamped; or the at least one covering member being made of an elastic material.

8. The connection structure of claim 7, wherein the outer seal prevents escape of electrolyte which leaks from between the cell case and the at least one washer and wherein the inner seal prevents escape of electrolyte which leaks from between the at least one washer and a terminal protruding through the at least one washer.

9. The connection structure of claim 7, wherein a clamping of the inner section restricts movement or distortion of the outer section so as to prevent escape of electrolyte through the outer seal.

10. The connection structure of claim 7, wherein the outer section comprises at least one sealing projection.

11. The connection structure of claim 10, wherein the at least one sealing projection comprises a cross-sectional shape which is one of semicircular, polygonal, and pointed.

12. The connection structure of claim 10, wherein the at least one sealing projection comprises at least two sealing projections.

13. The connection structure of claim 7, wherein each of the inner section and the outer section are circular.

14. The connection structure of claim 13, wherein the outer section includes externally arranged cutaway sections for avoiding interference between adjacent covering members.

15. The connection structure of claim 7, wherein the at least one covering member comprises a material having a Shore hardness of Hs 65 or above.

16. The connection structure of claim 15, wherein the at least one covering member is made of silicone rubber.

17. A connection structure for a battery unit having a plurality of cells wherein each of the cells includes terminals, each terminal having at least one clamping washer, the connecting structure comprising:

a plurality of coupling plates, each arranged to connect a terminal of one cell to a terminal of an adjacent cell;

a plurality of covering members, each comprising two tubular sections, such that each tubular section is arranged to cover a terminal;

a lid being provided to cover a tubular section in order to allow access to a terminal when each lid is opened or removed;

each tubular section comprising an inner ring-shaped clamping section and an outer section;

each outer section being arranged to surround a terminal and to pressed against a cell surface so as to create an outer seal with the cell surface; and each inner clamping section being adapted to be clamped between the at least one clamping washer and a coupling plate so as to create an inner seal with the at least one clamping washer;

the connecting structure further comprising at least one of:

a lid for covering each tubular section in order to allow access to the terminal when each lid is opened or removed;

a projection arranged on the inner section which is deformed when the inner section is clamped; or each covering member being made of an elastic material, wherein a clamping of the inner section restricts a movement or distortion of the outer section so as to prevent escape of electrolyte through the outer seal.

18. The connection structure of claim 17, wherein the outer seal prevents escape of electrolyte which leaks from between the cell case and the at least one washer and wherein the inner seal prevents escape of electrolyte which leaks from between the at least one washer and a terminal protruding through the at least one washer.

19. The connection structure of claim 17, wherein the outer section comprises at least one sealing projection which has a cross-sectional shape which is one of semicircular, polygonal, and pointed.

20. The connection structure of claim 17, wherein the at least one covering member comprises a one of a silicone rubber material and a material that has a Shore hardness of Hs 65 or above.

* * * * *